(12) United States Patent
Yoshida et al.

(10) Patent No.: US 7,705,516 B2
(45) Date of Patent: Apr. 27, 2010

(54) DRIVE UNIT

(75) Inventors: Ryuichi Yoshida, Sakai (JP); Kazuhiro Shibatani, Sakai (JP)

(73) Assignee: Konica Minolta Opto, Inc., Tokyo (JP)

( * ) Notice: Subject to any disclaimer, the term of this patent is extended or adjusted under 35 U.S.C. 154(b) by 58 days.

(21) Appl. No.: 12/082,460

(22) Filed: Apr. 10, 2008

(65) Prior Publication Data

US 2008/0252173 A1 Oct. 16, 2008

(30) Foreign Application Priority Data

Apr. 12, 2007 (JP) ............................. 2007-104539

(51) Int. Cl.
*H01L 41/09* (2006.01)
(52) U.S. Cl. ................. 310/316.03; 310/317
(58) Field of Classification Search ............ 310/316.03, 310/317

See application file for complete search history.

(56) References Cited

U.S. PATENT DOCUMENTS 6,204,591 B1 * 3/2001 Nariai ................... 310/316.03
6,433,459 B1 * 8/2002 Okada ......................... 310/317
6,630,768 B2 * 10/2003 Yamashiro et al. .......... 310/317
6,844,658 B2 * 1/2005 Hoshino ................. 310/316.03
6,876,126 B2 * 4/2005 Okada ......................... 310/317
7,154,210 B2 * 12/2006 Hoshino ..................... 310/317

FOREIGN PATENT DOCUMENTS

JP 2001-211669 A 8/2001
JP 2001-298656 A 10/2001

\* cited by examiner

*Primary Examiner*—Thomas M Dougherty
(74) *Attorney, Agent, or Firm*—Brinks Hofer Gilson & Lione

(57) ABSTRACT

It is provided a drive unit 1 in which the displacement amount of the frictional engagement member 7 can be reduced without lowering the driving torque, having a drive circuit 4 comprised of a bridge circuit which includes charge switching elements Q1, Q3 for connecting the electrodes 5a, 5b of the piezoelectric element 5 to the power supply 2 and discharge switching elements Q2, Q4 for connecting the electrodes 5a, 5b to ground, and a switch circuit 9 for inserting a limiting resistor R2 in at least either one of an current path between the power supply 2 and the piezoelectric element 5 and an current path between the piezoelectric element 5 and the ground.

8 Claims, 9 Drawing Sheets

DRIVE UNIT

This application is based on application No. 2007-104539 filed in Japan, the contents of which are hereby incorporated by reference.

BACKGROUND OF THE INVENTION

The present invention relates to a friction-drive type drive unit using a piezoelectric element.

There is publicly known a friction-drive type drive unit in which a shaft-like vibrating member is reciprocatively displaced asymmetrically in its axial direction by a piezoelectric element so that a frictional engagement member frictionally engaged with the vibrating member is slidingly displaced relative to the vibrating member (which can be done by moving the frictional engagement member or by moving the vibrating member).

Such a friction-drive type drive unit involves a drive circuit for applying a periodically varying voltage to the piezoelectric element. Utilized therefor among others is a drive circuit which applies a rectangular-wave voltage to the piezoelectric element by applying a voltage to the electrodes of the piezoelectric element or grounding those electrodes with the use of a semiconductor switching element.

For example, JP2001-211669A discloses a full bridge circuit for connecting both electrodes of a piezoelectric element alternately to power supply while grounding the other electrode so that a polarity applied to the piezoelectric element is inverted.

In such a friction-drive type drive unit for drive with a rectangular-wave voltage as shown above, the frictional engagement member keeps a constant amount of sliding displacement per pulse of the rectangular-wave voltage, thus being incapable of obtaining any displacements lower than the constant amount.

Changing the duty ratio of the rectangular-wave voltage makes it possible to reduce the sliding displacement amount of the frictional engagement member per pulse. However, when the duty ratio of the rectangular-wave voltage is changed to reduce the sliding displacement amount of the frictional engagement member, the moving speed of the frictional engagement member that is moved in frictional engagement with the vibrating member would be increased, causing the driving torque to decrease, as a problem.

Also, in the friction-drive type drive unit, keeping the frictional engagement member continuously displaced within a narrow range would lead to changes in driving characteristics due to wear or the like, as a further problem.

SUMMARY OF THE INVENTION

In view of the above and other issues, an object of the present invention is to provide a friction-drive type drive unit which allows the displacement amount of the frictional engagement member to be reduced without lowering the driving torque.

In order to achieve the above object, according to the present invention, there is provided a drive unit comprising: a piezoelectric element which is to be elongated and contracted with a voltage applied to between its electrodes; a vibrating member one end of which is fixed to the piezoelectric element and which can be reciprocatively displaced in an axial direction by elongation and contraction of the piezoelectric element; a frictional engagement member which is frictionally engaged with the vibrating member and which is slidingly displaced relative to the vibrating member by reciprocative displacements of the vibrating member; and a drive circuit which is connected to power supply and which applies a voltage of the power supply to the piezoelectric element with a specified driving period, wherein the drive circuit comprises a bridge circuit which includes a charge switching element for connecting the electrodes of the piezoelectric element to the power supply and a discharge switching element for grounding the electrodes of the piezoelectric element to ground, and a switch circuit for inserting a limiting resistor in at least either one of an current path between the power supply and the piezoelectric element and an current path between the piezoelectric element and the ground, and wherein the piezoelectric element is elongated and contracted by applying a voltage thereto with the limiting resistor inserted in the current path, whereby the frictional engagement member is slowly displaced.

With this constitution, by the insertion of the limiting resistor, a current charged to or discharged from the piezoelectric element can be limited, so that the piezoelectric element can be charged or discharged slowly. Thus, the piezoelectric element can be elongated or contracted slowly, so that the frictional engagement member can be displaced slowly.

Also in the drive unit of the invention, the switch circuit may comprise a bypass current path for bypassing the limiting resistor; a limited current path including the limiting resistor; a bypass switch for opening the bypass current path; and a limiting switch for opening the limited current path.

With this constitution, closing the bypass switch allows the frictional engagement member to be driven at high speed, while opening the bypass switch to close the limiting switch allows the frictional engagement member to be driven at low speed. Thus, a displacement speed of the frictional engagement member can be selected.

Also in the drive unit of the invention, with the limiting resistor inserted, the piezoelectric element may be disconnectable from at least either one of the power supply and the ground before charging or discharging of the piezoelectric element is completed.

With this constitution, when the frictional engagement member is slowly displaced with the limiting resistor inserted and then the piezoelectric element is disconnected on the way of charging or discharging of the piezoelectric element, the piezoelectric element can be maintained in a halfway charged state so as to be fixed at any arbitrary length. Thus, the frictional engagement member can be stopped at any arbitrary displacement amount.

Also in the drive unit of the invention, the drive unit may further comprise a monitor circuit for monitoring the voltage between the electrodes of the piezoelectric element, wherein the piezoelectric element is disconnected from the power supply when the voltage between the electrodes has reached a value corresponding to a desired displacement amount of the frictional engagement member.

With this constitution, dimensional displacements of the piezoelectric element can be monitored by the voltage between the electrodes, so that the stop position of the frictional engagement member can be controlled accurately.

Also in the drive unit of the invention, it is also allowable that the limiting resistor is inserted only when either one of the electrodes of the piezoelectric element is connected to the power supply, and the limiting resistor is not inserted when the one of the electrodes is connected to the ground.

With this constitution, dimensional displacements only in either one direction of elongation and contraction of the piezoelectric element can be slowed down by the limiting resistor. Thus, even if a load is given to the frictional engagement member that is to be positionally displaced slowly, the frictional engagement member is less likely to slip, hence high driving torque.

According to the present invention, by the insertion of the limiting resistor, the piezoelectric element can be elongated or contracted slowly, so that the frictional engagement member can be displaced slowly. Thus, there can be realized drive units of high torque as well as drive units of high positioning accuracy.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE PREFERRED EMBODIMENT

Figure 1:
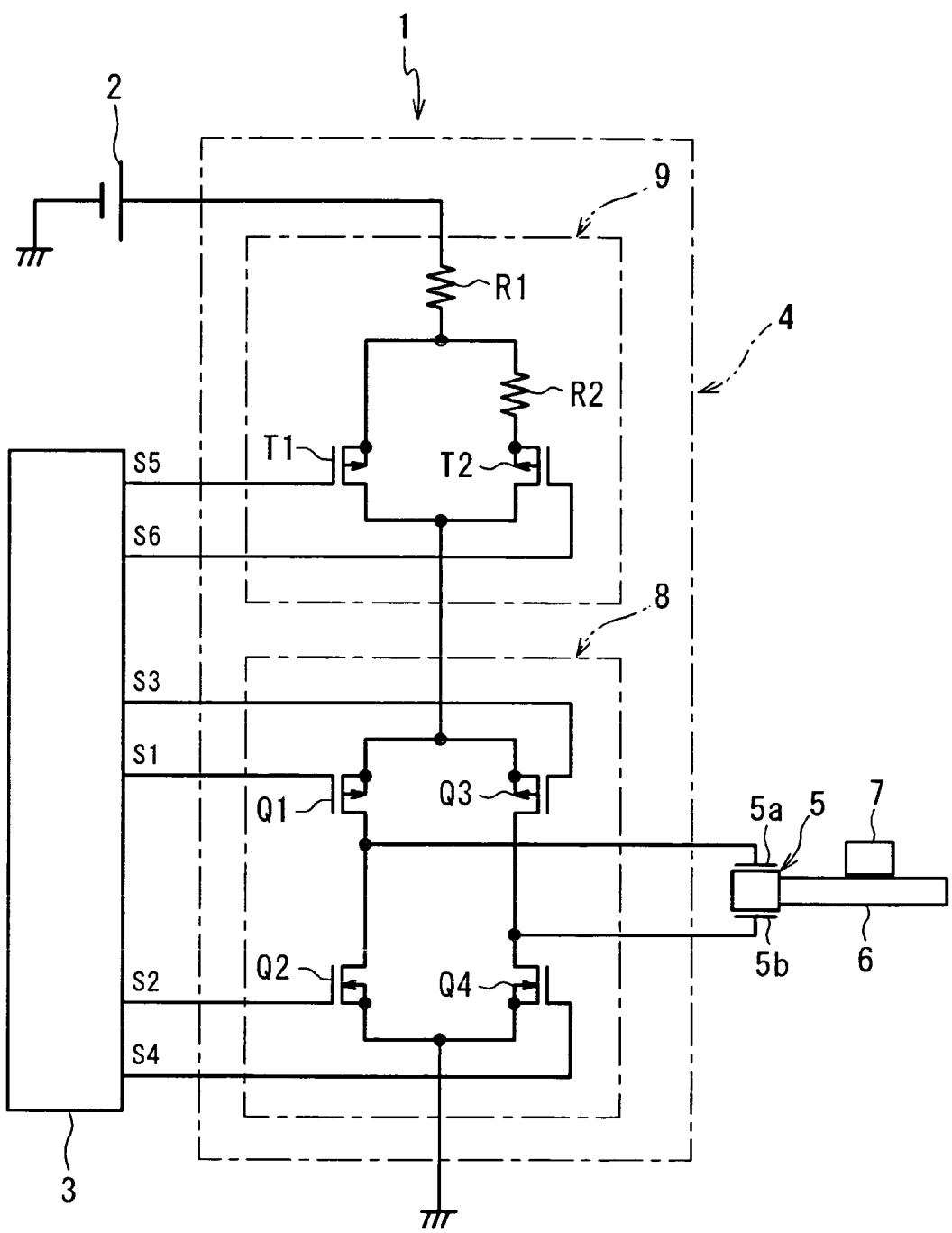
FIG. 1 is a circuit diagram of a drive unit according to a first embodiment of the invention.

FIG. 1 shows a construction of a drive unit 1 according to a first embodiment of the invention. The drive unit 1 has a drive circuit 4 to which a DC power supply 2 of a voltage Vp (V) and a control device 3 are connected, a piezoelectric element 5 having electrodes 5a, 5b to which an output of the drive circuit 4 is to be applied, a shaft-like vibrating member 6 whose one end is fixed to the piezoelectric element 5, and a frictional engagement member 7 to be engaged with the vibrating member 6 by frictional force.

The piezoelectric element 5 is so formed as to elongate and contract in an axial direction of the vibrating member 6 in response to a voltage applied to between the electrodes 5a, 5b. Elongation and contraction of the piezoelectric element 5 causes the vibrating member 6 to be reciprocatively moved in the axial direction. When the vibrating member 6 slowly moves, the frictional engagement member 7 moves along therewith as it keeps frictionally engaged with the vibrating member 6. When the vibrating member 6 moves abruptly, the frictional engagement member 7 tends to stay as it is by its inertia force, resulting in a sliding move on the vibrating member 6.

The drive circuit 4 is made up of a bridge circuit 8 which includes four transistors Q1, Q2, Q3, Q4 to be turned on/off by control signals S1, S2, S3, S4, respectively, of the control device 3, and a switch circuit 9 which includes two transistors T1, T2 to be turned on/off by control signals S5, S6, respectively, of the control device 3 and further includes a base resistor R1 and a limiting resistor R2.

The transistor Q1 is a charge switching element implemented by a p-channel FET which, when turned on, applies a voltage Vp (V) of the power supply 2 to the electrode 5a of the piezoelectric element 5, and the transistor Q2 is a discharge switching element implemented by an n-channel FET which, when turned on, makes the electrode 5a grounded. The transistor Q3 is a charge switching element implemented by a p-channel FET which, when turned on, applies the voltage Vp (V) of the power supply 2 to the electrode 5b, and the transistor Q4 is a discharge switching element implemented by an n-channel FET which, when turned on, makes the electrode 5b grounded.

The control device 3 outputs periodical (e.g., with a frequency of 140 kHz) rectangular-wave control signals S1, S2, S3, S4 for driving the transistors Q1, Q2, Q3, Q4, respectively, where the control signal S1 and the control signal S2 are of an identical waveform (e.g., with a duty ratio of 0.7) while the control signal S3 and the control signal S4 are roughly inverted outputs of the control signals S1, S2, respectively. Thus, the control device 3 controls the drive circuit in a manner that the transistor Q1 and the transistor Q4 are turned on roughly simultaneously, while the transistor Q2 and the transistor Q3 are turned on when the transistor Q1, Q4 are off. That is, the bridge circuit 8 is a full bridge circuit that applies the voltage Vp (V) of the power supply 2 to either one of the electrodes 5a, 5b of the piezoelectric element 5 while making the other grounded, and that alternately switches over between the electrodes 5a, 5b, to which the voltage Vp (V) is applied.

In the switch circuit 9, the transistor T1 is a bypass switch which, when turned on, bypasses the limiting resistor R2, allowing the power supply 2 to be connected to the bridge circuit 8. On the other hand, the transistor T2, with the transistor T1 off, is turned on, allowing the power supply 2 to be connected to the bridge circuit 8 via the limiting resistor R2. In other words, the transistor T2 functions as a limiting switch that inserts the limiting resistor R2 in an current path between the power supply 2 and the bridge circuit 8. The base resistor R1, including an internal resistance of the power supply 2 or the like, is not necessarily mounted as an independent device.

In this embodiment, there are provided slight overlaps between the control signals S1, S2 and the control signals S3, S4. As a result, switching of the electrodes 5a, 5b, to which the voltage Vp (V) of the power supply 2 is applied, causes the two electrodes 5a, 5b to be short-circuited instantaneously, so that part of electric charge stored in either one of the electrodes 5a, 5b is transferred to the other. This allows the power consumption to be saved.

The piezoelectric element 5 can be regarded as a capacitor from a circuit's point of view. In this embodiment, its capacitance is 100 (nF) as an example. Also, the resistance value of the base resistor R1 is 3.3Ω as an example, and the resistance value of R2 is 10 kΩ as an example.

Figure 2:
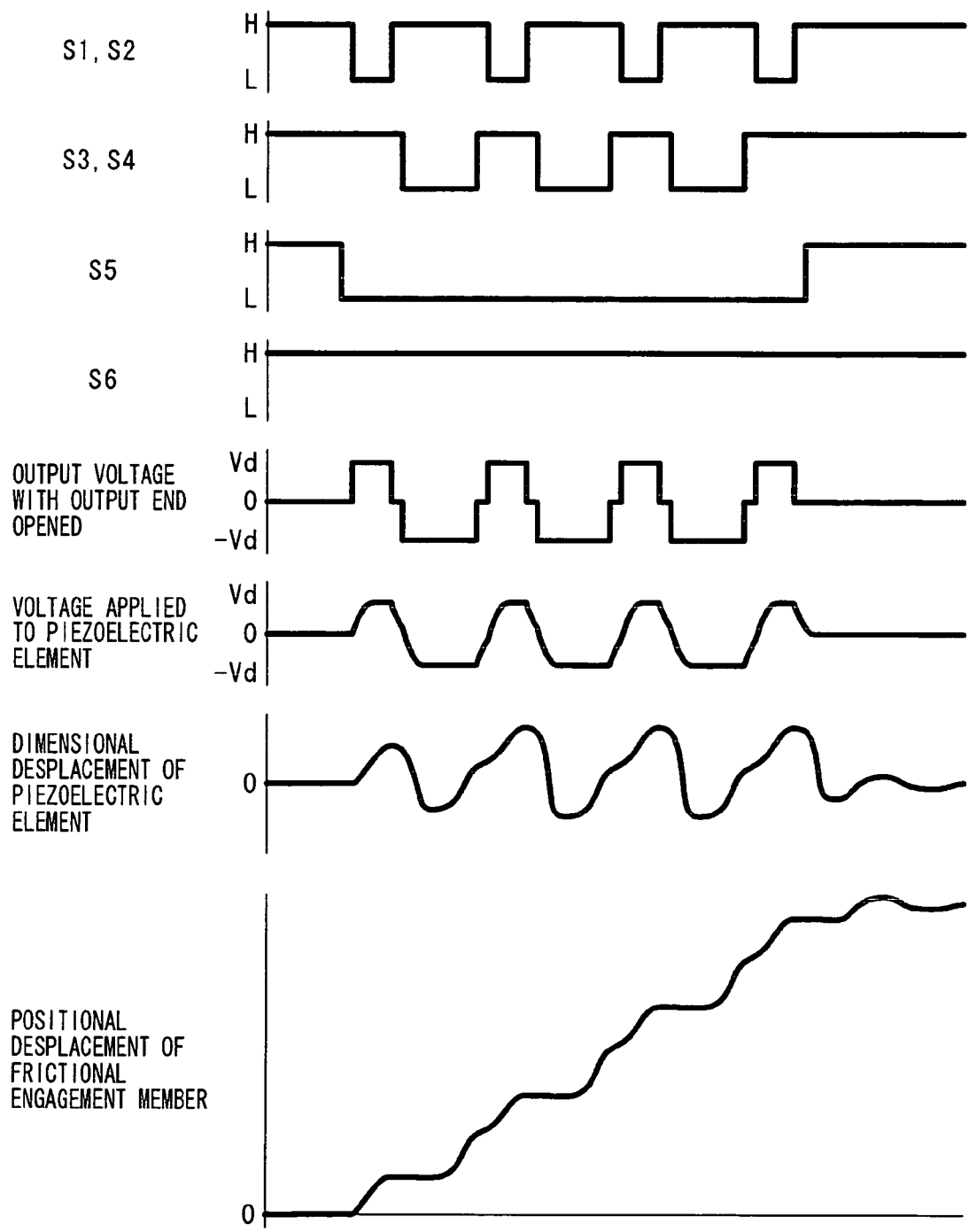
FIG. 2 is a time chart of normal drive in the drive unit of FIG. 1.

In the drive unit 1, as shown in FIG. 2, when the frictional engagement member 7 is put into sliding displacement, the control signal S5 is set to Low to turn on the transistor T1 while the control signal S6 is set to High to turn off the limiting switch T2, in which state the transistors Q1, Q2, Q3, Q4 are driven by the rectangular-wave control signals S1, S2, S3, S4. As a result, the drive circuit 4 keeps either one of the electrodes 5a, 5b of the piezoelectric element 5 connected to the power supply 2 via the base resistor R1 while making the other grounded. In this case, the voltage applied to the piezoelectric element 5 has a waveform which has a delay in its leading edge, as shown in the figure, due to a voltage drop in the base resistor R1.

The voltage between the electrodes 5a, 5b of the piezoelectric element 5 can be determined as a voltage change of an RC circuit composed of the piezoelectric element 5 and the base resistor R1. A time constant representing the degree of leading edge delay in this voltage change is 330 (nsec). In contrast to this, the operating frequency of the transistors Q1, Q2, Q3, Q4 is 140 kHz (with a driving period of about 7.1 μsec), and the delay of voltage applied to the piezoelectric element 5 does not cause so much deformation of the actual waveform.

The piezoelectric element 5 also has a delay in dimensional displacements (elongation and contraction) relative to the applied voltage because of elasticity or the like. As this delay differs depending on the frequency of the applied voltage, the piezoelectric element 5 in this embodiment shows sawtooth-shaped dimensional displacements having slow elongation and abrupt contraction as shown in FIG. 2.

These dimensional displacements of the piezoelectric element 5 show displacements in the axial direction of the vibrating member 6. That is, when the vibrating member 6 is pushed out slowly, the frictional engagement member 7 is moved (displaced) along with the vibrating member, and when the vibrating member 6 is pulled back abruptly, the frictional engagement member 7 tends to stay in situ by its own inertia force so as to slidingly move on the vibrating member 6. By repeating this operation, the drive unit 1 moves the frictional engagement member 7 with its absolute position going farther from the piezoelectric element 5.

Reversely operating the control signals S1, S2, S3, S4, i.e. setting the duty ratio of voltage applied to the piezoelectric element to 0.7, causes the waveform of dimensional displacements of the piezoelectric element 5 to be reversed in direction, so that the frictional engagement member 7 can be driven reversely so as to be directed toward the piezoelectric element 5.

The drive unit 1 is also designed so as to finely adjust the position of the frictional engagement member 7 by slowly elongating and contracting the piezoelectric element 5 so that the frictional engagement member 7 does not slidingly move relative to the vibrating member 6.

Figure 3:
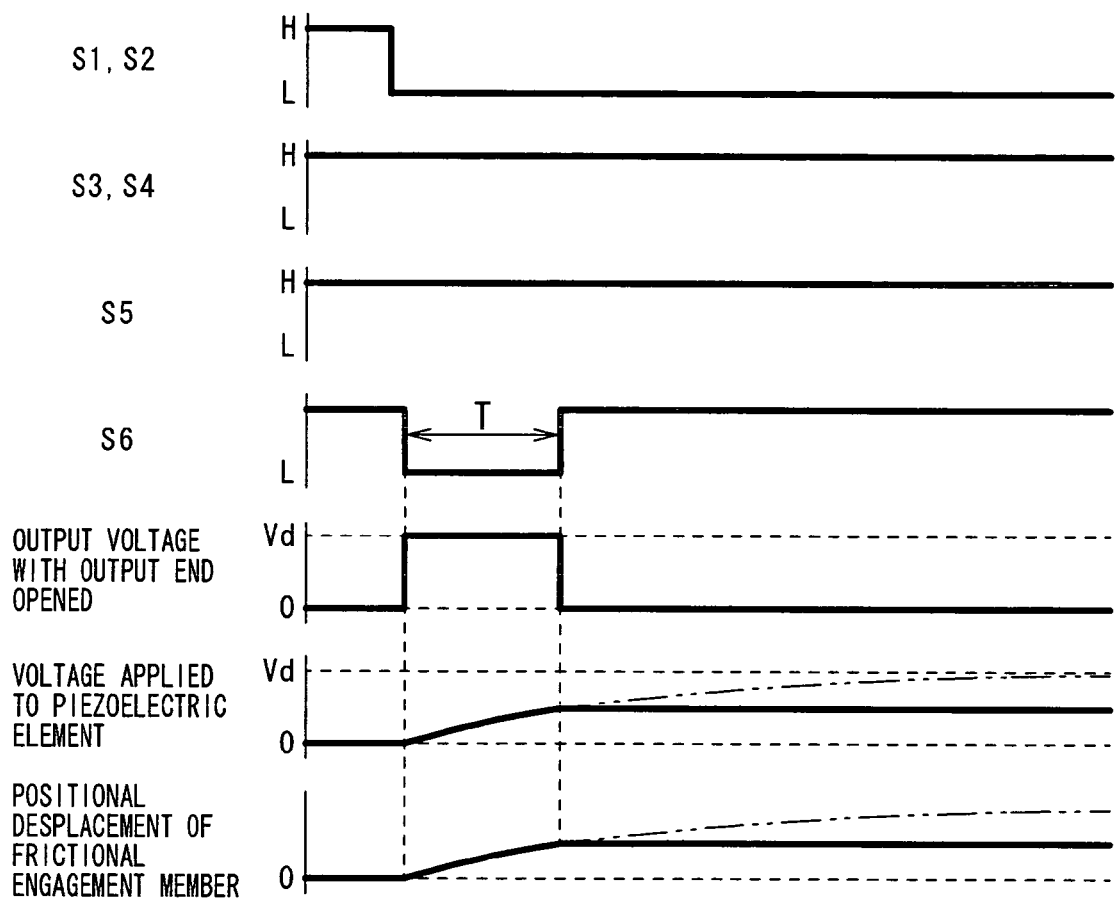
FIG. 3 is a time chart of fine-adjustment drive in the drive unit of FIG. 1.

For the fine adjustment of the position of the frictional engagement member 7, as shown in FIG. 3, the control signal S5 is set to High to turn off the bypass switch T1, while the control signals S1, S2 are set to Low, the control signals S3, S4 are set to High, and the control signal S6 is held Low for a necessary time period T. That is, with the electrode 5b of the piezoelectric element 5 grounded and with the electrode 5a set connectable to the power supply 2 via the switch circuit 9, turning on the insertion switch T2 causes the limiting resistor R2 to be inserted between the electrode 5a and the power supply 2 to close the circuit.

In this case, the time constant of the RC circuit formed by the piezoelectric element 5 and the limiting resistor R2 is 1 (msec), and the voltage applied to the piezoelectric element 5 rises slow as shown in the figure. Because of the slow voltage change, the dimensional displacement delay of the piezoelectric element 5 is substantially negligible, and the frictional engagement member 7 is positionally displaced in accordance with the waveform of the voltage applied to the piezoelectric element 5.

Then, while the applied voltage is increasing, i.e., before the piezoelectric element 5 is completely charged from the power supply 2, the control signal S6 is returned to High and the insertion switch T2 is turned off. As a result, the piezoelectric element 5 is instantaneously disconnected from the power supply 2, and therefore retains the already stored charge so as to maintain the dimensions corresponding to the charge. Thus, the drive unit 1 retains the position of the frictional engagement member 7 as it is at the moment that the insertion switch T2 is turned off.

A positional displacement of the frictional engagement member 7 can be expressed as a function of time that depends on the piezoelectric element 5 and the limiting resistor R2. Therefore, if a distance to which the frictional engagement member 7 is to be moved is determined, then the time T until the control signal S6 is set to Low can be determined. Actually, it is appropriate that a lookup table in which move distances of the frictional engagement member 7 and the time T for setting the control signal S6 to Low are associated with each other is stored in the control device 3.

Figure 4:
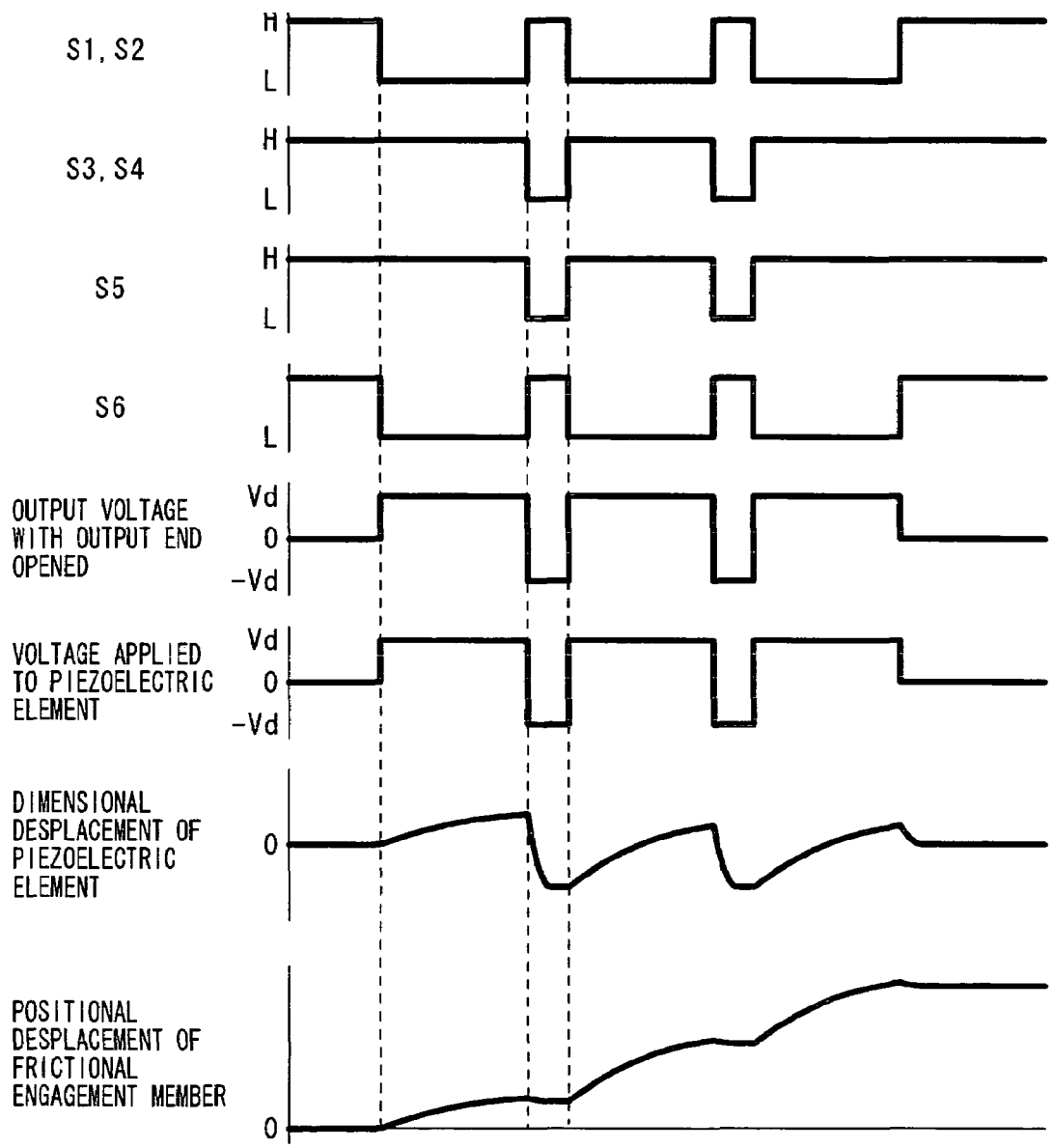
FIG. 4 is a time chart of high-torque, low-speed drive in the drive unit of FIG. 1.

Also in the drive unit 1 of this embodiment, as shown in FIG. 4, the frictional engagement member 7 can be driven at low speed with high torque by operating the control signal S5 and the control signal S6 reversely to each other in synchronization with the control signals S1, S2, S3, S4.

That is, the limiting resistor R2 is inserted to slow down the dimensional displacement of the piezoelectric element 5 for either one of elongation and contraction of the piezoelectric element 5, while the limiting resistor R2 is bypassed to steepen the dimensional displacement of the piezoelectric element 5 for the other. As a result, acceleration applied to the frictional engagement member 7 that is moved along with the vibrating member 6 decreases so that a proportionally larger load can be driven.

The time duration for which the limiting resistor R2 keeps instead to charge the piezoelectric element 5 should be no shorter than the time constant of the RC circuit formed by the piezoelectric element 5 and the limiting resistor R2. In this embodiment, as an example, while the time constant of the RC circuit is 1 (msec), the time for the control switch T2 to turn on is set to about 2.5 (sec), so that the drive frequency as a whole is about 400 Hz.

Figure 5:
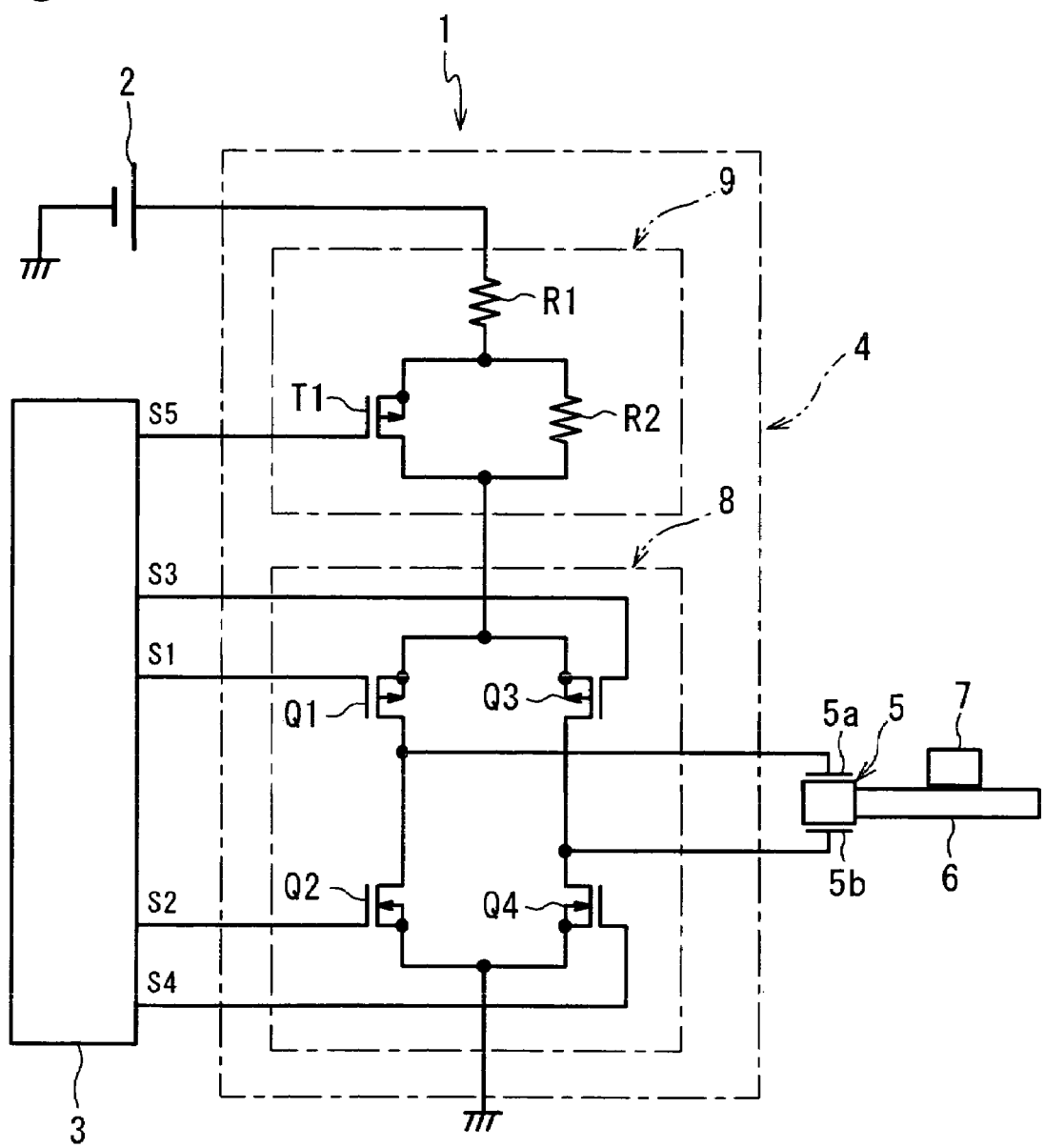
FIG. 5 is a circuit diagram of a drive unit according to a second embodiment of the invention.

FIG. 5 shows a drive unit 1 according to a second embodiment of the invention. In the following description, like components as those which have been described previously are designated by like reference numerals, and their description is omitted. The drive unit 1 of this embodiment is so configured that the insertion switch T2 for the switch circuit 9 is omitted in the first embodiment.

Therefore, the switch circuit 9 of this embodiment is enabled to select the way of connecting the power supply 2 and the bridge circuit 8 to each other either via the base resistor R1 alone or by inserting the limiting resistor R2 in addition to the base resistor R1, but unable to open the current path between the power supply 2 and the bridge circuit 8.

Figure 6:
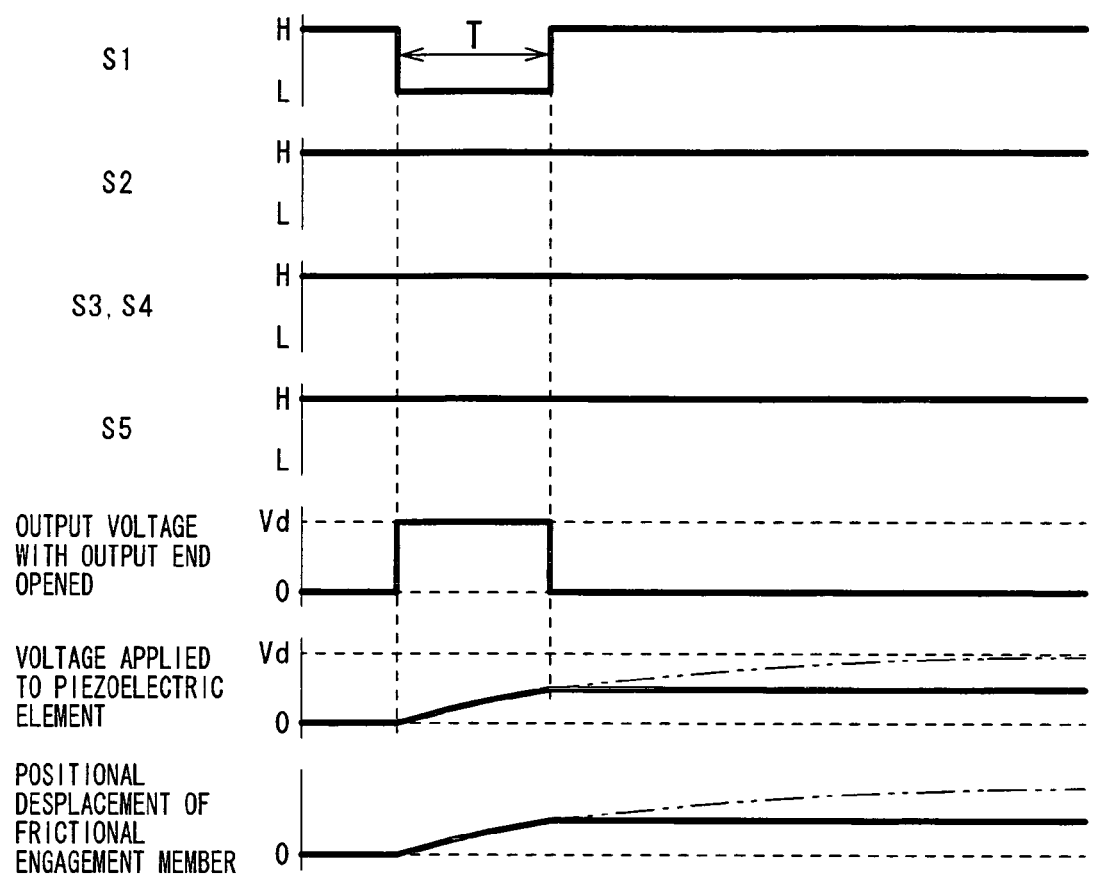
FIG. 6 is a time chart of fine-adjustment drive in the drive unit of FIG. 5.

Accordingly, in this embodiment, when the frictional engagement member 7 is slowly moved so as to be accurately positioned, the control signal S1 and the control signal S2 are changed independently of each other as shown in FIG. 6. In more detail, the bypass switch T1 is opened to insert the limiting resistor R2, and the transistor Q3 is turned off and the transistor Q4 is turned on so that the electrode 5b of the piezoelectric element 5 is grounded, and further the transistor Q2 is turned off. In this state, only the transistor Q1 is changed. In this operation, the transistor Q1 holds on for a time duration T corresponding to a move quantity of the frictional engagement member 7. Also by this operation, as in the first embodiment, a current can be fed from the power supply 2 to the piezoelectric element 5 via the limiting resistor R2 for the time duration T, so that the frictional engagement member 7 can be positioned to a desired position.

Figure 7:
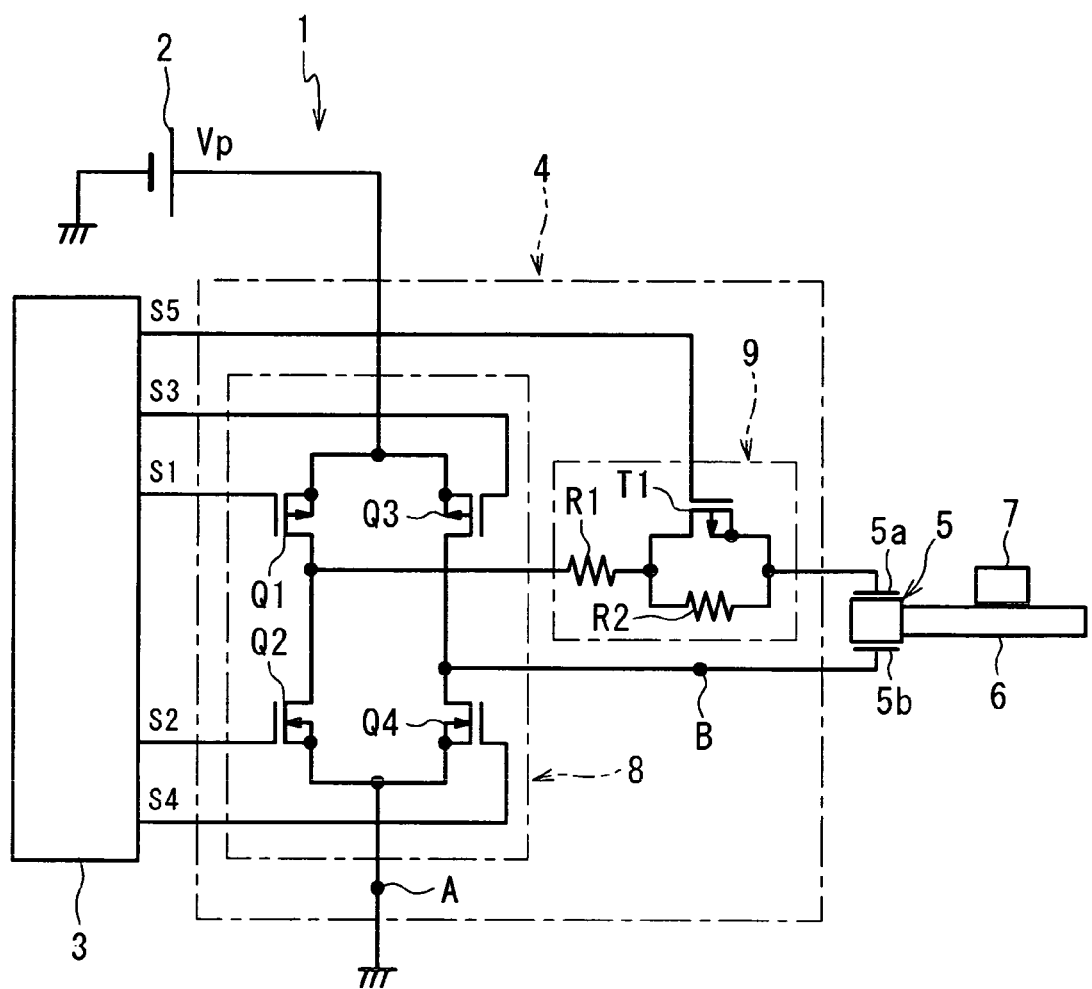
FIG. 7 is a circuit diagram of a drive unit according to a third embodiment of the invention.

Further, FIG. 7 shows a drive unit 1 according to a third embodiment of the invention. In this embodiment, a switch circuit 9 is provided on an current path between the bridge circuit 8 and the piezoelectric element 5. In this embodiment, in the case where the frictional engagement member 7 is slowly moved so as to be accurately positioned, if the control signals S1, S2 are High, the current charged from the power supply 2 to the electrode 5a of the piezoelectric element 5 via the transistor Q1 is limited by the limiting resistor R2. If the control signals S1, S2 are Low, the current discharged from the electrode 5a to the ground via the transistor Q2 is limited by the limiting resistor R2.

Instead, the switch circuit 9 may be provided on an current path (point A) at which the electrodes 5a, 5b of the piezoelectric element 5 are grounded in FIG. 7. Further, also when the frictional engagement member 7 is moved slowly so as to be accurately positioned, the piezoelectric element 5 may be dimensionally displaced by a full bridge circuit using the control signals S1, S2 and the control signals S3, S4. In this case, the switch circuit 9 may be provided on an current path (point B) that serves for charging and grounding of the electrode 5b of the piezoelectric element 5.

Figure 8:
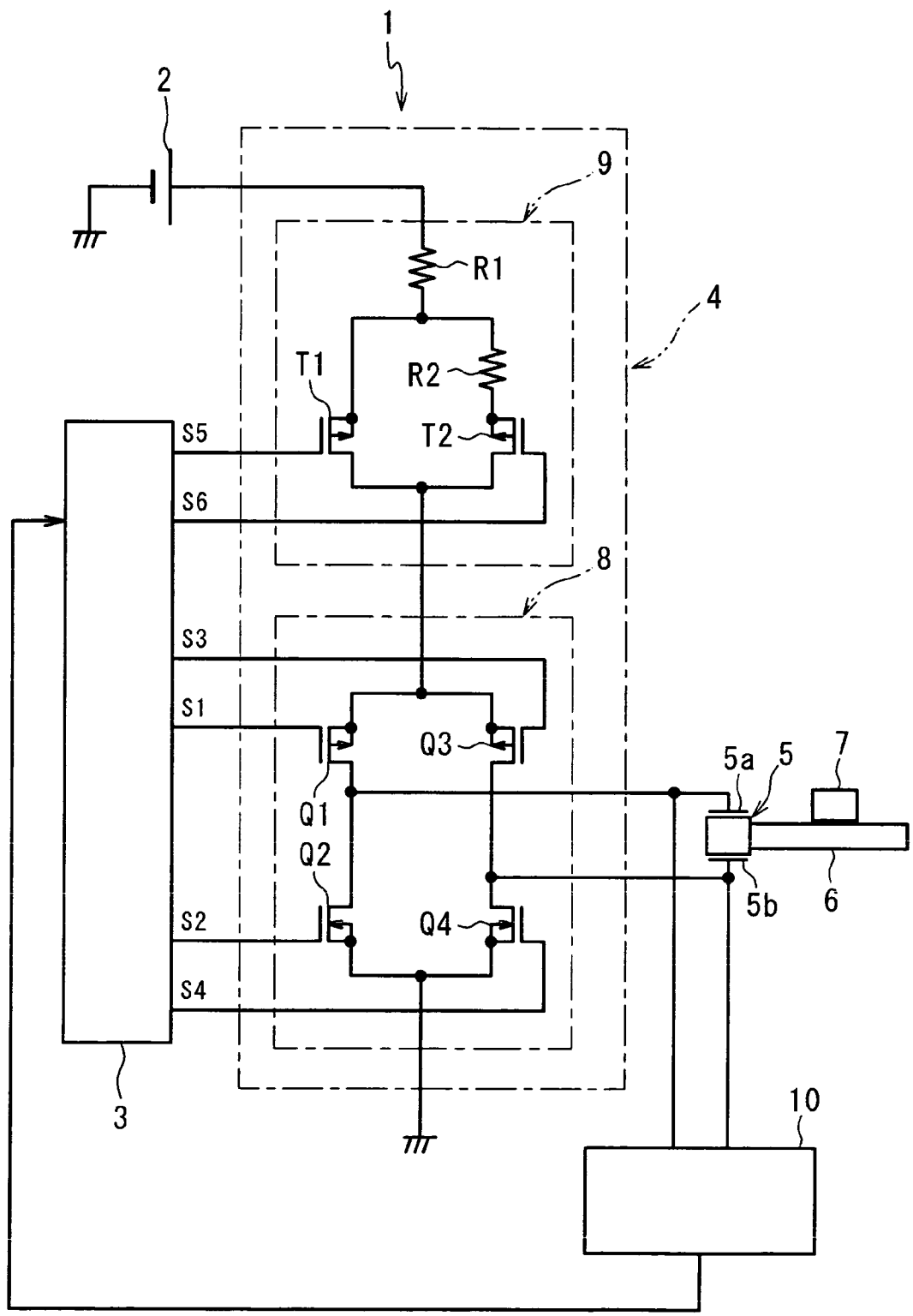
FIG. 8 is a circuit diagram of a drive unit according to a fourth embodiment of the invention.

Still further, FIG. 8 shows a drive unit 1 according to a fourth embodiment of the invention. The drive unit 1 of this embodiment further has a monitor circuit 10 for monitoring a voltage between the electrodes 5a, 5b of the piezoelectric element 5.

In fine-adjustment drive with the limiting resistor R2 inserted, since the voltage applied to the piezoelectric element 5 changes slowly, dimensional displacements of the piezoelectric element 5 can be measured by the voltage applied to the piezoelectric element 5. Therefore, as the monitor circuit 10 detects a voltage applied to the piezoelectric element 5 and inputs the detected voltage to the control device 3, the control device 3, instantaneously upon acknowledgement of a dimensional displacement of the piezoelectric element 5 corresponding to a position at which the frictional engagement member 7 should be stopped, disconnects the piezoelectric element 5 from the power supply 2, thereby stopping the frictional engagement member 7 accurately at the desired position.

In the foregoing embodiments, the bridge circuit 8 is a full bridge circuit that is enabled to apply voltages Vp (V) and −Vp (V) alternately to between the electrodes 5a, 5b of the piezoelectric element 5. However, the bridge circuit 8 may also be a half bridge circuit that applies 0 (V) and Vp (V), alternately.

INDUSTRIAL APPLICABILITY

Figure 9:
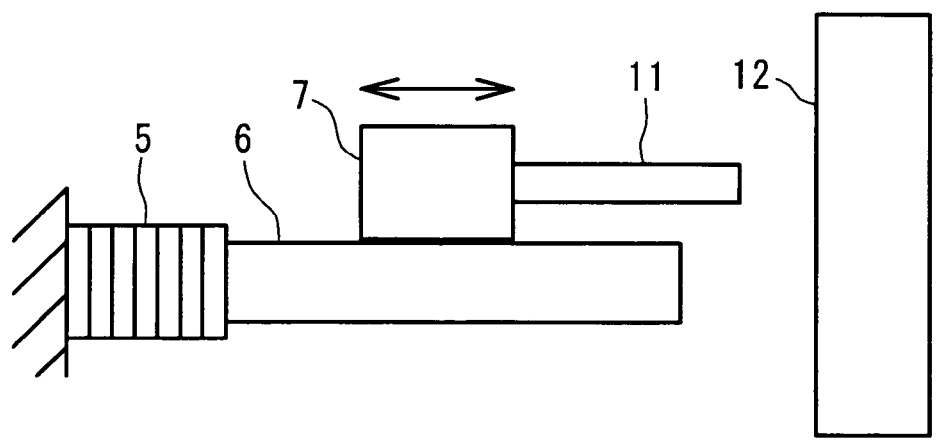
FIG. 9 is a schematic view showing a first application example of the drive unit of the invention.

The drive unit 1 according to the present invention can be utilized, for example, as a drive unit for scanning tunneling microscopes as shown in FIG. 9. In a scanning tunneling microscope, there is a need that a probe 11 for detecting a tunneling current be made to approach a test specimen 12 up to a distance on the nm order on which the tunneling current flows. At the time of setting of the test specimen 12, the distant between the test specimen 12 and the probe 11 is ten odd mm. First, while the distance between the probe 11 and the test specimen 12 is monitored by an unshown sensor, the probe 11 is made to approach the test specimen 12 up to about 100 μm by normal drive operation of the drive unit 1 in which the limiting resistor R2 is not inserted. Subsequently, the limiting resistor R2 is inserted only for elongation of the piezoelectric element 5, and the frictional engagement member 7 is driven at low speed with high torque until a tunneling current can be detected by the probe 11. Finally, when the tunneling current detected by the probe 11 comes to a maximum, the piezoelectric element 5 is disconnected from the power supply 2, by which the frictional engagement member 7 is stopped. In this way, the drive unit 1 of this invention is enabled to fulfill high-speed drive, low-speed drive and accurate positioning drive operations.

Figure 10:
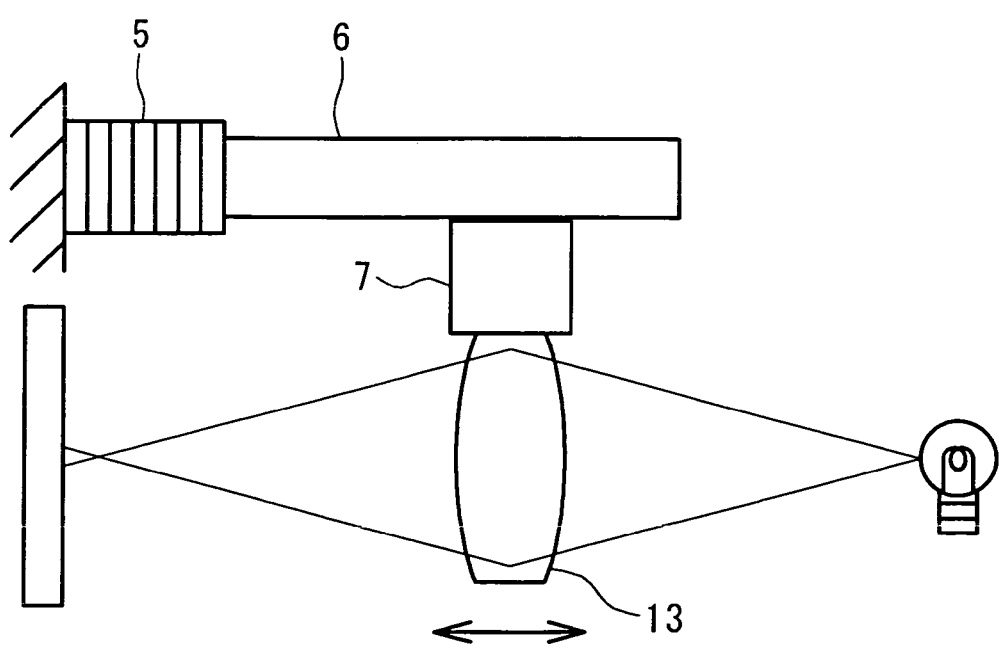
FIG. 10 is a schematic view showing a second application example of the drive unit of the invention.

The drive unit 1 according to the invention is suitable also for drive operation that is called dither operation, as is exemplified by a contrast-detection type autofocus device as shown in FIG. 10, in which a lens 13 is kept normally vibrating to check for contrast variations of image formation so that the lens 13 is positioned at a position where the contrast comes to a maximum. In this autofocus device, rough focusing is performed at high speed without the insertion of the limiting resistor R2, while dither operation is performed with the limiting resistor R2 inserted and without sliding displacement of the frictional engagement member 7 to the vibrating member 6. As a result of this, high speed focusing and precision focusing can be achieved at the same time. Moreover, since the frictional engagement member 7 is not slidingly moved relative to the vibrating member 6, the fear that local wearing of the frictional engagement member 7 and the vibrating member 6 might go further to shorten the life of the drive unit 1 can be eliminated.

Although this embodiment has been described on the drive unit 1 in which the piezoelectric element 5 is fixed while the absolute position of the frictional engagement member 7 is moved, yet the invention may is be applied to self-propelled type drive units. For instance, in the drive unit 1 of the foregoing embodiments, if the piezoelectric element 5 is fixed to a moving stage while the frictional engagement member 7 is fixed to a housing, there is provided a self-propelled type stage moving mechanism in which the vibrating member 6 and the piezoelectric element 5 are moved relative to the frictional engagement member 7 (the frictional engagement member 7 is slidingly moved relative to the vibrating member 6) to drive a moving stage.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A drive unit, comprising:
   a piezoelectric element configured to elongate and contract when a voltage is applied to electrodes of the piezoelectric element;
   a vibrating member having one end thereof fixed to the piezoelectric element and which is configured to be reciprocally displaced in an axial direction by the elongation and contraction of the piezoelectric element;
   a frictional engagement member which frictionally engages the vibrating member and which is slidingly displaceable relative to the vibrating member by reciprocal displacements of the vibrating member; and
   a drive circuit connected to power supply, which applies a voltage of the power supply to the piezoelectric element with a specified driving period, wherein the drive circuit comprises:
   a bridge circuit which includes a charge switching element configured to connect the electrodes of the piezoelectric element to the power supply;
   a discharge switching element configured to connect the electrodes of the piezoelectric element to ground; and a switch circuit configured to insert a limiting resistor in at least either one of a current path between the power supply and the bridge circuit and a current path between the bridge circuit and the ground;

the switch circuit comprising a limited current path including the limiting resistor, and a bypass current path including a bypass switch for opening the bypass current path in parallel with the limited current path; and wherein the piezoelectric element is elongated and contracted by applying a voltage thereto with the limiting resistor inserted in the current path, so that the frictional engagement member is slowly displaced.

2. The drive unit as claimed in claim 1, wherein the limited current path includes a limiting switch for opening the limited current path.

3. The drive unit as claimed in claim 1, wherein with the limiting resistor inserted, the piezoelectric element is disconnectable from at least either one of the power supply and the ground before charging or discharging of the piezoelectric element is completed.

4. The drive unit as claimed in claim 3, further comprising a monitor circuit for monitoring the voltage between the electrodes of the piezoelectric element, wherein the piezoelectric element is disconnected from the power supply when the voltage between the electrodes has reached a value corresponding to a desired displacement amount of the frictional engagement member.

5. The drive unit as claimed in claim 1, wherein the limiting resistor is inserted only when either one of the electrodes of the piezoelectric element is connected to the power supply, and the limiting resistor is not inserted when the one of the electrodes is connected to the ground.

6. The drive unit as claimed in claim 1, wherein the bridge circuit is operated periodically when the bypass switch is closed so as to slidingly displace the frictional engagement member relative to the vibrating member.

7. The drive unit as claimed in claim 6, wherein the bridge circuit is operated non-periodically when the bypass switch is opened so as to adjust the position of the frictional engagement member slowly without sliding displacement relative to the vibrating member.

8. The drive unit as claimed in claim 7, wherein the piezoelectric element is disconnected from the power supply when the voltage between the electrodes has reached a value corresponding to a desired displacement amount of the frictional engagement member in the non-periodic operation with the bypass switch opened.

* * * * *